United States Patent [19]

Wang

[11] Patent Number: 5,028,037
[45] Date of Patent: Jul. 2, 1991

[54] AUTOMATIC LIFTING APPARATUS

[76] Inventor: John Wang, No. 129, Tuan-Chu Lane, Tuan-Chu Li, Chiayi City, Taiwan

[21] Appl. No.: 352,374

[22] Filed: May 12, 1989

[51] Int. Cl.$^5$ .............................................. F16F 9/06
[52] U.S. Cl. .............................. 267/64.13; 267/64.26
[58] Field of Search ................. 267/64.13, 64.26, 117, 267/131, 64.12, 64.16; 188/269; 248/566, 624; 92/169.1; 297/345

[56] References Cited

U.S. PATENT DOCUMENTS

| 1,953,172 | 4/1934 | Griffiths | 92/169.1 X |
| 2,618,478 | 11/1952 | Conway | 267/64.26 X |
| 3,543,643 | 12/1970 | Southwell | 92/169.1 X |
| 4,245,826 | 1/1981 | Wirges | 267/131 |
| 4,465,266 | 8/1984 | Hale | 267/131 |
| 4,886,248 | 12/1989 | Delhaye et al. | 267/64.26 |

FOREIGN PATENT DOCUMENTS 1480170  6/1970  Fed. Rep. of Germany ... 267/64.26

Primary Examiner—Douglas C. Butler
Assistant Examiner—Chris Schwartz
Attorney, Agent, or Firm—Lackenbach Siegel Marzullo & Aronson

[57] ABSTRACT

An automatic raising apparatus includes a hollow cylinder having a partition member separating said cylinder into a first chamber and a second chamber. A floating piston is mounted in said second chamber defining a third chamber. A sleeve member is mounted slidably and coaxially in said cylinder and has a first end connected with an article to be raised or lowered and an open second end extending through the partition member into the second chamber. The sleeve member has an axial bore which is opened toward the second chamber, and a radial hole formed thereon communicating the bore and the first chamber. A yieldably resilient member is mounted or contained in the third chamber biasing the floating piston to cause the sleeve member to move outward relative to cylinder. Fluid fills the first and second chambers and the bore of the sleeve member. A piston member is annularly fixed to the sleeve member in the first chamber and is sealed and slidably engaged with an inner surface of the cylinder in the first chamber. A stop valve device is provided for being manually closed and opened to alternately to stop and permit fluid flow between the first chamber and the second chamber. Whereby, the article to be raised and lowered can be held at a desired height by controlling the stop valve device during the raising or lowering operation.

8 Claims, 4 Drawing Sheets

AUTOMATIC LIFTING APPARATUS

BACKGROUND OF THE INVENTION

This invention relates to an automatic raising apparatus, more particularly to an automatic raising apparatus which can automatically raise an article, such as a seat of a chair, to a limited height wherein said lifting action of said article can be manually stopped at any time during the automatic raising process.

In recent years, several types of height-adjustable chairs have been developed. In these chairs, each seat thereof can be adjusted to an appropriate level by a raising apparatus which can automatically raise said seat to a limited height. However, such a raising apparatus cannot stop the seat at any desired point during the automatic raising process.

SUMMARY OF THE INVENTION

It is therefore a main object of this invention to provide an automatic raising. Apparatus which can manually position an article, the height of which is required to be adjusted, such as the seat of a chair, at a desired height.

Accordingly, an automatic raising apparatus of the present invention includes:

a hollow cylinder with a first and a second closed end, said hollow cylinder also having a partition member mounted therein to axially separate said cylinder into a first chamber and a second chamber;

a floating piston mounted in said second chamber defining a third chamber adjacent the second closed end of said cylinder;

a sleeve member mounted slidably and coaxially in said cylinder and having a first end protruding beyond the first closed end of said cylinder which connects with an article to be raised or lowered, and an open second end extending through the partition member into said second chamber, the sleeve member and said article to be raised or lowered being adapted to move between a first position where said article to be raised or lowered is spaced apart from said cylinder at a maximum distance and a second position wherein said article is spaced apart from said cylinder at a minimum distance, the sleeve member further having an axial bore which is opened toward said second chamber, and a radial hole formed thereon communicating between said bore and said first chamber;

a yieldably resilient means mounted in said third chamber biasing the floating piston to cause the sleeve member to move outward relative to the cylinder so as to raise said article attached thereto;

a fluid filling the first and second chambers and said bore of the sleeve member which is under the pressure of said yieldably resilient means;

a piston member annularly fixed to the sleeve member in the first chamber which is sealed and slidably engaged with an inner surface of the cylinder in said first chamber; and a stop valve device mounted to the sleeve member for being manually closed and opened to alternately stop and permit fluid flow between the first chamber and the second chamber. Whereby, the article to be raised or lowered can be held at any position between said first and second position by manually closing the stop valve device to stop fluid flow between the first chamber and the second chamber.

BRIEF DESCRIPTION OF THE DRAWINGS

Other features and advantages of this invention will become apparent in the following detailed description of the preferred embodiments of this invention with reference to the accompanying drawings, in which.

DETAILED DESCRIPTION OF THE PREFERRED EMBODIMENTS

Figure 1:
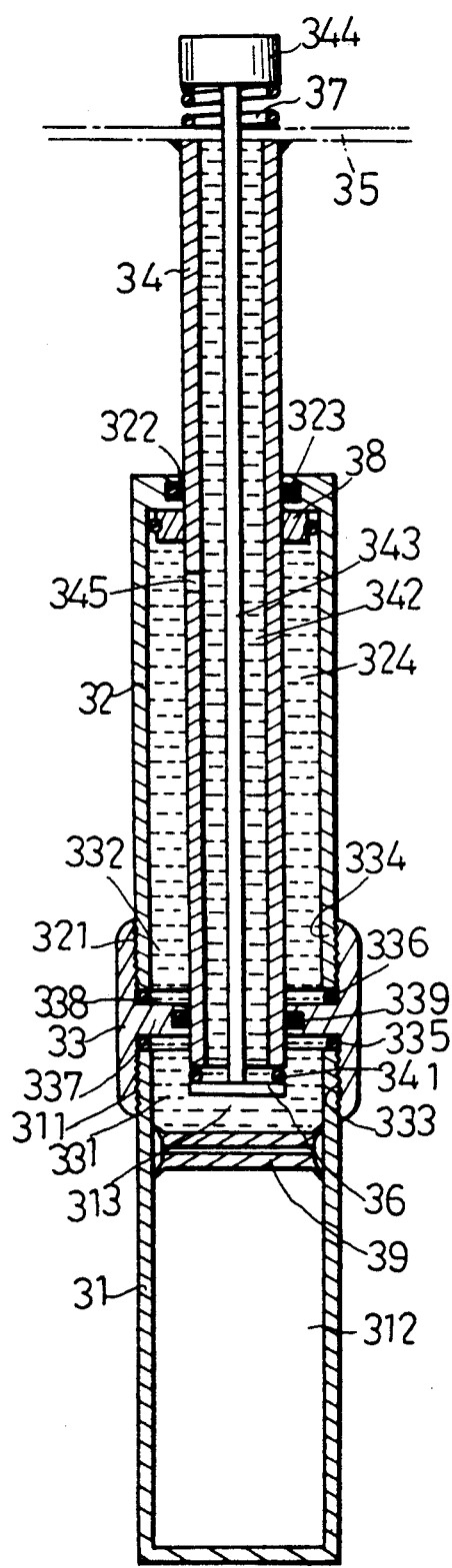
FIG. 1 is a sectional view of a first preferred embodiment of an automatic raising apparatus of this invention.

Referring to FIG. 1, a sectional view of a first preferred embodiment of an automatic raising apparatus of this invention is shown. The apparatus includes an upper tube 32 and a lower tube 31 each of which has an open end. Said tubes 31, 32 are respectively provided with externally threaded portions 311, 321 adjacent the open ends thereof. A partition member 33 in the form of a hollow cylinder has a partition 337 formed therein defining two opposed receiving portions 331, 332 in which have internally threaded portions 333, 334 formed therein so that the open ends of said upper and lower tubes 31, 32 are screwed into the partition and are respectively provided with oil seals 335, 336 for sealing purposes. Thereby, a first chamber 324 and a second chamber 313 are respectively defined in the upper tube 32 and the lower tube 31. A sleeve member 34 is installed slidably and coaxially in the upper and lower tubes 32, 31. The lower end of the sleeve member 34 passes through a hole 322 formed in the upper closed end of the upper tube 32 which is provided with an oil seal 323 for sealing purposes. The lower end of the sleeve member 34 passes through a through hole 338 in the partition 337 of the partition member 33, which is also provided with an oil seal 339 for sealing purposes, and extends into the second chamber 313. The upper end of the sleeve member 34 is fixedly connected with an article to be raised or lowered 35. The lower open end of the sleeve member 34 is closed by a stop valve 36 which is provided with an oil seal 341. A linking rod 343 is mounted axially in an axial bore 342 formed in the sleeve member 34 and has a lower end connected with the stop valve 36 and a upper end passing through said article to be raised or lowered 35 to connect with a controlling device 344. The controlling device 344 is biased upward by suitable static member in the form of a coil spring 37 which is disposed between said article to be raised or lowered 35 and said controlling device 344 so as to enable the stop valve 36 to close the open end of the sleeve member 34 when any weight bearing upon the article to be raised or lowered 35 is removed. The controlling device 344 can be actuated to permit the linking rod and therefore, the stop valve 36, to move downward in order to open the open end of the sleeve member 34. In the first chamber 324 of the upper tube 32, the sleeve member 34 has a piston member 38 annularly fixed thereto so that said piston member 38 can move with said sleeve member 34. The piston member 38 is sealed and slidably engaged with the inner surface of the upper tube 32 in the first chamber 324. The piston member 38 will abut against the closed end of the upper tube 32 to prevent the sleeve member 34 from separating from the upper tube 32 when said sleeve member 34 is biased to lift the article to be raised or lowered 35 to a maximum height in a manner to be described hereinafter. A radial hole 345 is formed on the sleeve member 34 below the piston member 38 for communicating the axial bore 342 of the sleeve member 34 with the first chamber 324. A floating piston 39 is mounted in the second chamber 313 of the lower tube 31 thereby defining a third chamber 312 adjacent the closed end of the lower tube 31. The third chamber 312 contains a compressible gas, such as nitrogen, biasing the floating piston 39 to cause the sleeve member 34 to move upward relative to the upper tube 32. The first chamber 324, second chamber 313 above the floating piston 39 and the axial bore 342 of the sleeve member, are filled with hydraulic oil due to the pressure caused by said compressible gas in the third chamber 312.

Figure 2:
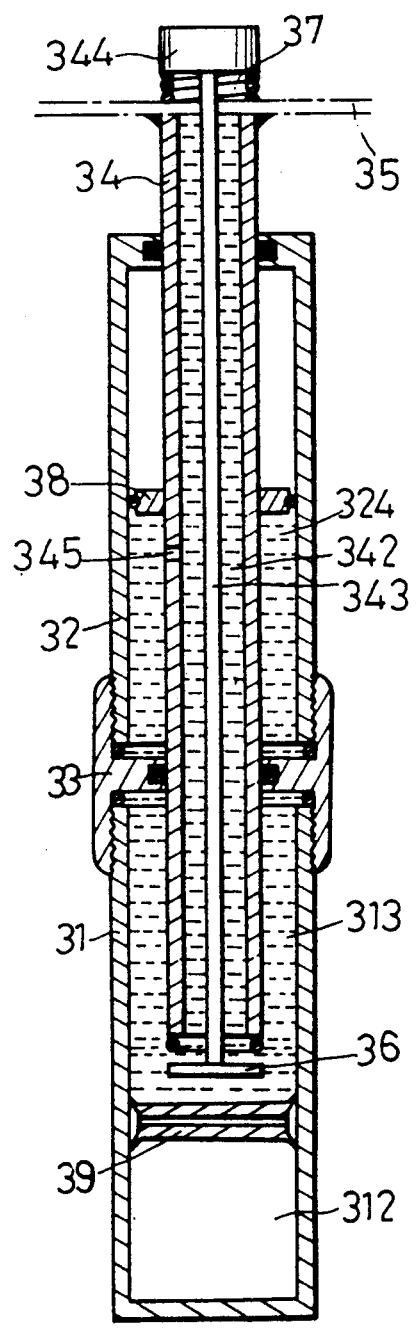
FIG. 2 is a sectional schematic view showing the first preferred embodiment of an automatic raising apparatus of this invention in an operative position.

Referring to FIG. 2, the article to be raised or lowered 35 is loaded and the controlling device 344 is actuated to lower the stop valve 36. The sleeve member 34 is also pressed down when a weight bears down upon the article to be raised or lowered. The piston member 38 then forces the oil in the first chamber 324 into the axial bore 342 via the radial hole 345, and forces the oil in the axial bore 342 to enter the second chamber 313 via the open end of the sleeve member 34. This in return forces the floating piston 39 to compress the compressible gas in the third chamber 312. During the abovementioned lowering operation, the article to be raised or lowered 35 can be held at a desired height by actuating the controlling device to enable the stop valve 36 to move upward, thus closing the open end of the sleeve member 34 and stopping the oil flow between the first chamber 324 and the second chamber 313. When the weight bearing upon the article to be raised or lowered is removed 35, the sleeve member 34 and therefore said article to be raised or lowered 35, can be lifted from a low position to a high position by actuating the controlling device 344 to open the open end of said sleeve member 34 permitting the oil in the second chamber 313 to flow back into the first chamber 324 via the open end and the radial hole 345 of said sleeve member 34 and forcing the piston member 38 to move upward as a result of the resilient force of the compressible gas. During this raising operation, the article to be raised or lowered 35 may be held at any desired height in a manner as described in the lowering operation.

Figure 3:
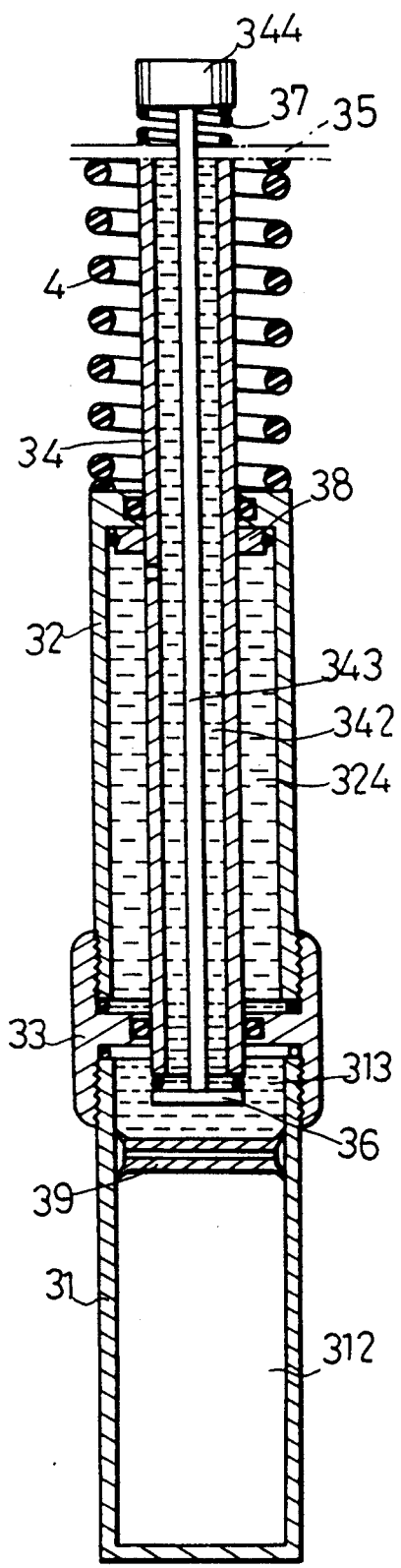
FIG. 3 is a sectional view of a second preferred embodiment of an automatic raising apparatus of this invention.
Figure 4:
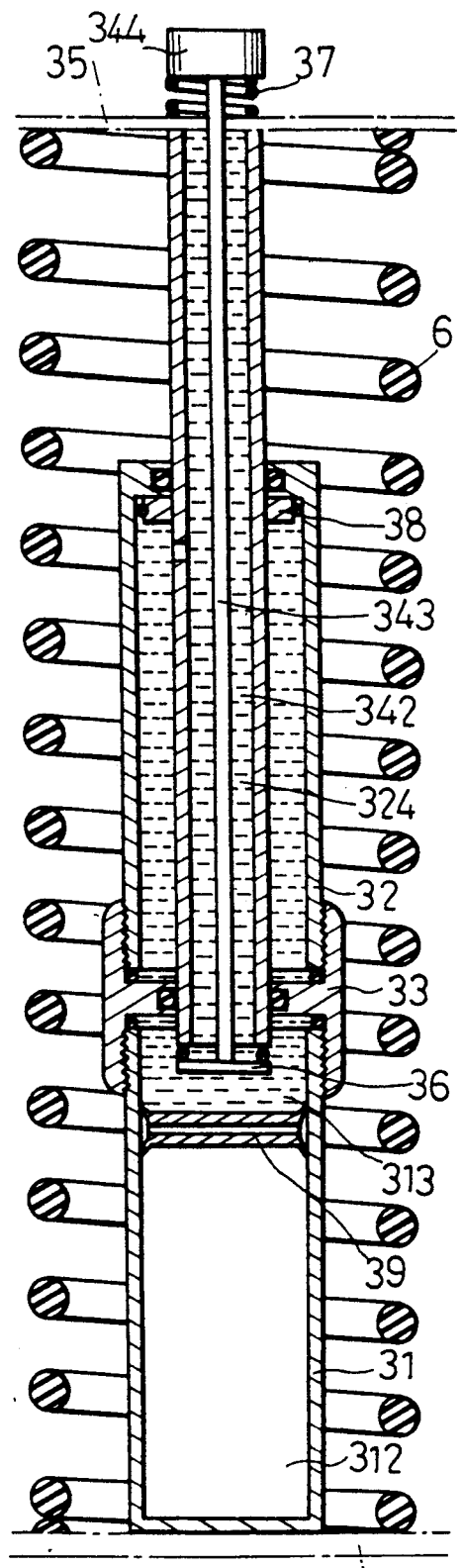
FIG. 4 is a sectional view of a third preferred embodiment of an automatic raising apparatus of this invention.

To achieve a better raising effect, a coil spring 4 is provided between the seat 35 and the closed end of the upper tube 32, as best illustrated in FIG. 3. Alternatively, a coil spring 6 is provided between the article to be raised or lowered 35 and the supporting base 5 of said article and is sleeved around the sleeve member 34, the upper tube 32 and the lower tube 31 for the purpose of increasing the ascending force of the apparatus, as best illustrated in FIG. 4.

Figure 5:
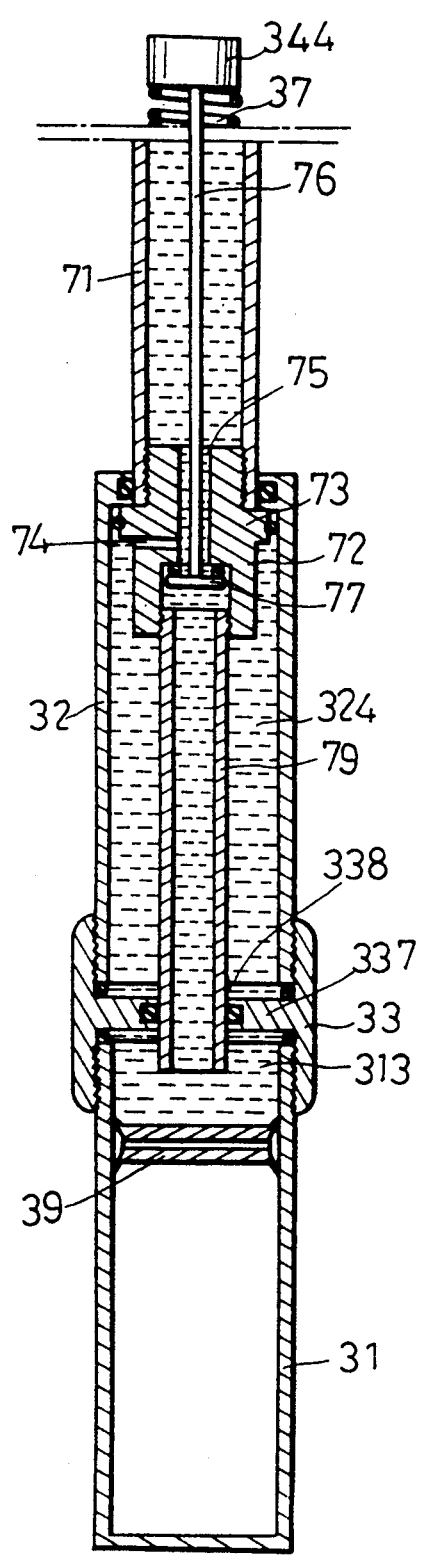
FIG. 5 is a sectional view of a fourth preferred embodiment of an automatic raising apparatus of this invention.
Figure 6:
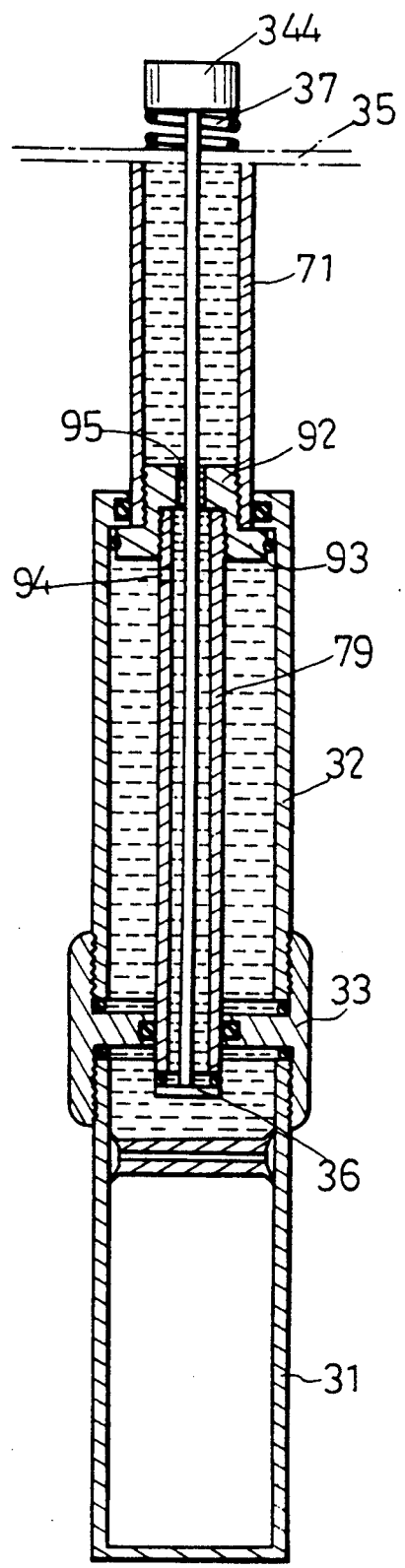
FIG. 6 is a sectional view of a fifth preferred embodiment of an automatic raising apparatus of this invention.

The alternative forms shown in FIGS. 5 and 6 differ from the embodiment shown in FIG. 1 only in the manner in which the sleeve member is formed with a upper section 71, a lower section 79 and a connecting member in the first chamber 324 having an upper end connected to the upper section 71 and a lower end connected with the lower section 79 by means of threading. Therefore, the same reference numerals have been retained for those parts which remain the same. In the embodiment shown in FIG. 5, the connecting member 72 includes a through bore 75 communicating the upper and lower sections 71, 79. A radial hole 74 is formed on the connecting member 72 to enable the oil to flow between the first chamber 324 and the through bore 75. A stop valve 77 and a linking rod 76 are mounted in the through bore 75. The linking rod 76 has one end connected with the stop valve 77 and another end connected with the controlling device 344, in a manner as described in the first embodiment, so that the stop valve can halt the oil flow between the first and second chambers 324, 313. An annular portion 73 is extended radially from the connecting member 72 and adapted to be sealed and slidably engaged with an inner surface of the upper tube 32 in the first chamber 324. The annular portion 73 has a function similar to that of the piston member 38 described in the first embodiment. The manner of operation is similar to that of the first embodiment. In this respect, the parts of this embodiment shown in FIG. 5 are easy to manufacture.

In the embodiment shown in FIG. 6, the connecting member 92 includes a through bore 95 communicating the upper and lower sections 71, 79. An annular portion 93 is extended radially from the lower end of the connecting member 92 and is adapted to be sealed and slidably engaged with the inner surface of the upper tube 32 in the first chamber 324 which functions as the piston member 38 described in the first embodiment. A radial hole 94 is formed at the lower section 79 for communicating the first chamber 324 with the lower section 79. In this case, the distance which the article to be raised or lowered 35 is greater than that of the embodiment shown in FIG. 5.

Figure 7:
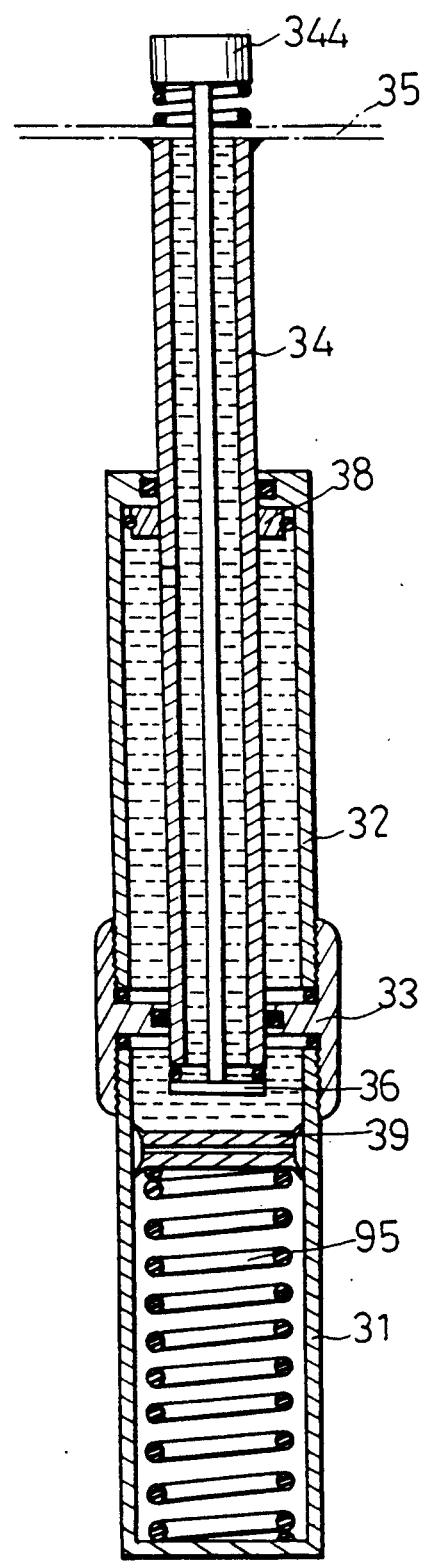
FIG. 7 is a sectional view of a sixth preferred embodiment of an automatic raising apparatus of this invention.

Another change can be made to the first embodiment shown in FIG. 1 wherein compressible gas is replaced by a coil spring, as best illustrated in FIG. 7. The manner of the operation is exactly the same as that of the first embodiment.

With this invention thus explained, it is apparent that numerous modifications and variations can be made without departing from the scope and spirit of this invention. It is therefore intended that this invention be limited only as indicated in the appended claims.

I claim:

1. An automatic apparatus comprising:

a hollow cylinder formed of two separate tube portions, each of said tubes having a closed end and an open end, and an external threaded portion formed near said opened ends thereof;

a partition member mounted to said hollow cylinder axially separating said cylinder into a fist chamber and a second chamber said partition member being in the form of a hollow clincher having a partition with a through hole communicating said first and second chambers formed therein defining two opposed receiving portions which are internally threaded so that said open ends of said two tube portions can be respectively screwed into said two receiving portions of said partition member and the closed ends of said two tube portions formed a first and second closed end of said hollow cylinder;

a floating piston mounted in said second chamber defining a third chamber adjacent said second closed end of said cylinder;
  a sleeve member mounted slidably and coaxially in said cylinder and having a first end protruding beyond said first closed end of said cylinder and an open second end extending through said partition member into said second chamber, said sleeve member being movable between a first position where said first end thereof is spaced apart from said cylinder at a maximum distance and a second position wherein said first end thereof is spaced apart form said cylinder at a minimum distance, said sleeve member further having an axial bore which is opined toward said second chamber and a radial hole formed thereon communicating said bore with said first chamber;
  a yieldably resilient means contained in said third chamber biasing said floating piston to cause said sleeve member to move outward relative to said cylinder so as to raise an article attached thereto;
  a fluid filling said first and second chambers and said bore of said sleeve member under the pressure of said yieldably
  a piston member annularly fixed to said sleeve member in said first chamber seleably and slidably engaged with an inner surface of said cylinder in said first chamber; and
  a stop valve device mounted to said sleeve member for being manually bloused and opened to alternately sop and permit fluid flow between said first chamber and said second chamber;
  said first end of said sleeve being holdable at a position between said first and said second position, by manually closing said stop valve device to stop fluid flow between said first chamber and said second chamber.

2. An automatic raising apparatus as claimed in claim 1, wherein an elastic member is mounted between said first closed end of said cylinder and said article to be raised or lowered.

3. An automatic raising apparatus as claimed in claim 1, wherein an elastic member is mounted between said second closed end of said cylinder and said article to be raised or lowered.

4. An automatic raising apparatus as claimed in claim 1, wherein said sleeve member comprises two sections and a connecting member in said first chamber which interconnects said two sections.

5. An automatic raising apparatus as claimed in claim 4, wherein said connecting member includes a through bore communicating said two sections of said sleeve member, a radial hole formed therein for communicating the fluid flow between said first chamber and said through bore of said sleeve member, a stop valve device mounted in said bore thereof so as to enable the fluid flow to be manually halted between said first and second chamber, and an annular portion extended radially therefrom which seals and slidably engages with an inner surface of said cylinder in said first chamber.

6. An automatic raising apparatus as claimed in claim 4, wherein said connecting member with two ends includes a through bore communicating said two sections of said sleeve member, and an annular portion extended radially from one of said ends thereof which seals and slidably engages with an inner surface of said cylinder in said first chamber.

7. An automatic raising apparatus as claimed in claim 1, wherein said yieldably resilient means is an elastic member.

8. An automatic raising apparatus as claimed in claim 1, wherein said yieldably resilient means is a compressible gas.

* * * * *